(12) United States Patent
Liao

(10) Patent No.: US 10,760,630 B2
(45) Date of Patent: Sep. 1, 2020

(54) BRAKE CALIPER DEVICE

(71) Applicant: Chih-Hsien Liao, Taichung (TW)

(72) Inventor: Chih-Hsien Liao, Taichung (TW)

( * ) Notice: Subject to any disclaimer, the term of this patent is extended or adjusted under 35 U.S.C. 154(b) by 141 days.

(21) Appl. No.: 16/128,591

(22) Filed: Sep. 12, 2018

(65) Prior Publication Data

US 2020/0080601 A1 Mar. 12, 2020

(51) Int. Cl.
| | | |
|---|---|---|
| *F16D 55/227* | (2006.01) | |
| *F16D 65/00* | (2006.01) | |
| *F16D 65/18* | (2006.01) | |
| *F16D 65/092* | (2006.01) | |
| *F16D 65/097* | (2006.01) | |
| *F16D 121/04* | (2012.01) | |
| *F16D 55/00* | (2006.01) | |

(52) U.S. Cl.
CPC ....... *F16D 55/227* (2013.01); *F16D 65/0056* (2013.01); *F16D 65/0075* (2013.01); *F16D 65/0087* (2013.01); *F16D 65/0093* (2013.01); *F16D 65/092* (2013.01); *F16D 65/0978* (2013.01); *F16D 65/18* (2013.01); *F16D 2055/002* (2013.01); *F16D 2055/007* (2013.01); *F16D 2055/0008* (2013.01); *F16D 2121/04* (2013.01)

(58) Field of Classification Search
CPC ............... F16D 55/227; F16D 65/0978; F16D 65/0075; F16D 65/18; F16D 65/0056; F16D 2055/002; F16D 65/0093; F16D 65/092; F16D 65/0087; F16D 2121/04; F16D 2055/0008; F16D 2055/007
USPC .......... 188/72.4, 73.1, 73.44, 73.45
See application file for complete search history.

(56) References Cited

U.S. PATENT DOCUMENTS

| | | | | |
|---|---|---|---|---|
| 4,726,451 | A * | 2/1988 | Giorgetti | F16D 55/22655 188/73.1 |
| 4,944,371 | A * | 7/1990 | Giorgetti | F16D 55/227 188/73.31 |
| 5,622,241 | A * | 4/1997 | Null | F16D 55/2255 188/73.42 |
| 10,030,723 | B1 * | 7/2018 | Liao | F16D 65/0971 |
| 2007/0051568 | A1 * | 3/2007 | Barbosa | F16D 55/227 188/73.45 |
| 2014/0202799 | A1 * | 7/2014 | Nishii | F16D 65/0006 188/73.37 |

FOREIGN PATENT DOCUMENTS

| | | | |
|---|---|---|---|
| EP | 3434925 A1 * | 1/2019 | |
| TW | 163856 | 7/1991 | |

\* cited by examiner

*Primary Examiner* — Pamela Rodriguez
(74) *Attorney, Agent, or Firm* — Burris Law, PLLC

(57) ABSTRACT

A brake caliper device adapted to be used with a brake disk includes a positioning unit, a main body unit, a lining unit, and an actuating unit. The positioning unit includes a positioning member that is adapted to be fixed to a vehicle body, two upper guiding members and a lower guiding member that is lower than the upper guiding members. The upper and lower guiding members are connected to the positioning member and extend along an axial direction parallel to a central axis of the brake disk. The main body unit is movably connected to the upper and lower guiding members. The actuating unit is operable to move the main body unit, thereby driving the lining unit to clamp the brake disk.

8 Claims, 9 Drawing Sheets

BRAKE CALIPER DEVICE

FIELD

The disclosure relates to a brake caliper device, and more particularly to a brake caliper device for a vehicle.

BACKGROUND

Taiwanese Patent No. 163856 discloses a conventional brake caliper device adapted to be mounted to a vehicle body and adapted to be used with a brake disk. The conventional brake caliper device includes a positioning frame that is adapted to be fixed to the vehicle body and that has opposite side parts for flanking the brake disk, a brake caliper that has opposite portions for flanking the positioning frame and the brake disk, and first and second brake pads that are respectively disposed at opposite sides of the brake disk. The positioning frame includes two guiding members. The brake caliper includes a first seat that is slidable relative to the positioning frame along an axis parallel to a central axis of the brake disc, and a second seat that is connected to the first seat. The first seat is formed with two receiving holes that respectively receive the guiding members, and a pressure member for pushing the first brake pad to abut against the brake disk. The second seat is proximate to the second brake pad. When the pressure member pushes the first brake pad to abut against the brake disk, the brake caliper is driven by a counterforce to move oppositely such that the second brake pad is simultaneously driven to abut against the brake disk.

However, since the guiding members of the positioning frame extend through an upper portion of the first seat, the positioning frame is easily driven by its own weight and the weights of the first and second brake pads to become inclined, such that the braking process become less smooth or even nonfunctional, which can be proven fatal.

SUMMARY

Therefore, an object of the disclosure is to provide a brake caliper device that can alleviate the drawback of the prior art.

According to the disclosure, the brake caliper device is adapted to be mounted to a vehicle body and adapted to be used with a brake disk. The brake disk has a first side surface and a second side surface opposite to the first side surface, both of which are perpendicular to a central axis of the brake disk. The brake caliper device has a positioning unit, a main body unit, a lining unit, and an actuating unit.

The positioning unit includes a positioning member that is adapted to be fixed to the vehicle body, two upper guiding members that are connected to the positioning member and that extend along an axial direction parallel to the central axis, and a lower guiding member that is connected to the positioning member, that extends along the axial direction, and that is lower than the upper guiding members.

The main body unit includes a first seat and a second seat. The first seat is connected to the upper guiding members and the lower guiding member, faces and is adapted to be adjacent to the first side surface of the brake disk, and is adapted to be movable along the axial direction relative to the first side surface of the brake disk. The second seat that is co-movably connected to the first seat, faces and is adapted to be adjacent to the second side surface of the brake disk faces and is adjacent to the second seat, and cooperates with the first seat to define a receiving space therebetween for receiving a part of the brake disk.

The lining unit includes a first lining member that is adapted to be disposed between the first seat and the first side surface of the brake disk, that is disposed in the receiving space, and that is movable along the axial direction, and a second lining member that is adapted to be movably disposed between the second seat and the second side surface of the brake disk, that is disposed in the receiving space, and that is movable along the axial direction.

The actuating unit is mounted to the first seat, is operable to push the first lining member to abut against the first side surface of the brake disk, so as to generate a counterforce to push the first seat away from the brake disk and to move the second seat to press the second lining member against the second side surface of the brake disk, thereby clamping the brake disk between the first and second lining members.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
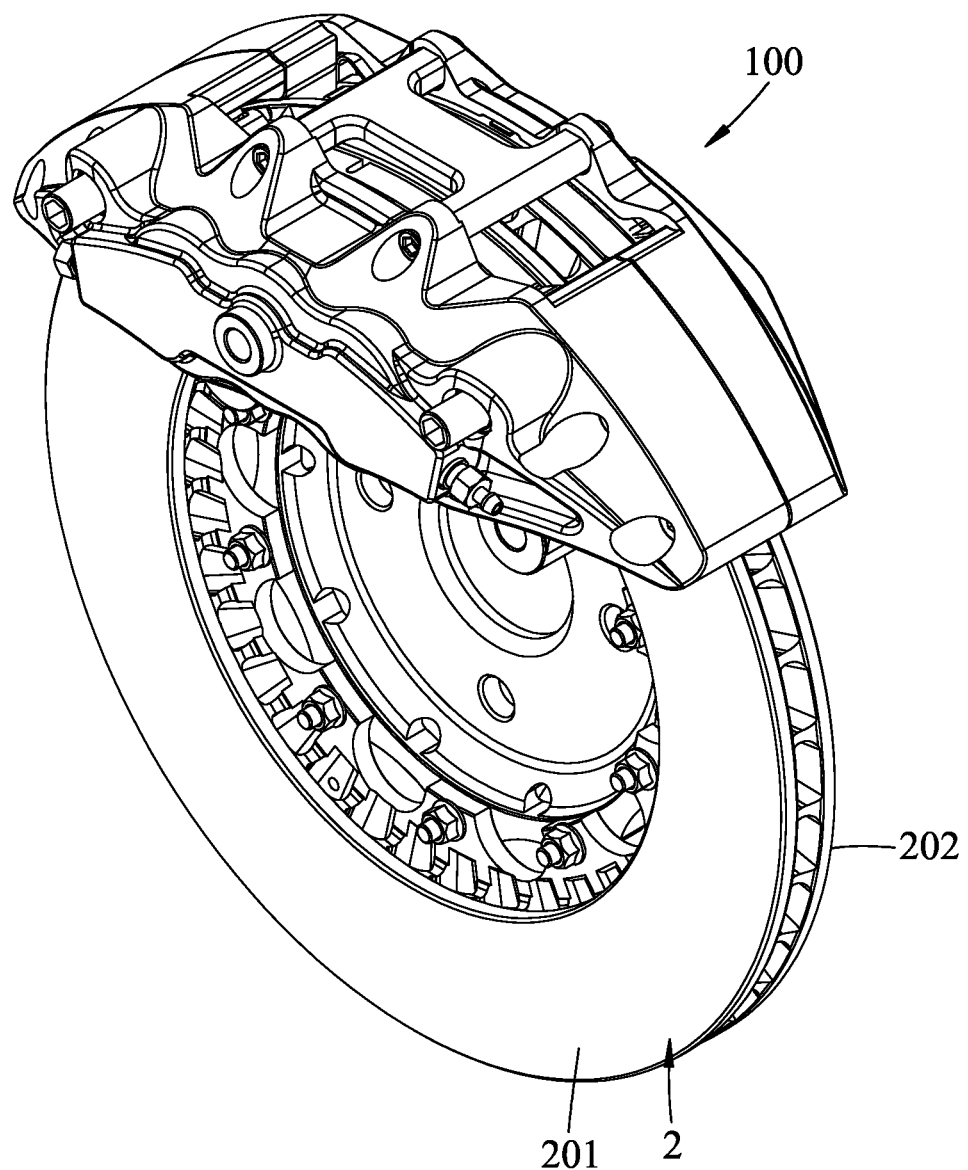
FIG. 1 is a perspective view of an embodiment of a brake caliper device according to the disclosure paired with a brake disk.

Referring to FIGS. 1 to 4, an embodiment of a brake caliper device 100 according to the disclosure is adapted to be mounted to a vehicle body 1 (see FIG. 4) and adapted to be used with a brake disk 2. The brake disk 2 has a first side surface 201 and a second side surface 202 opposite to the first side surface 201. The first and second side surfaces 201, 202 are perpendicular to a central axis (L) of the brake disk 2. The brake caliper device 100 includes a positioning unit 10, a main body unit 20, a lining unit 30, and an actuating unit 40.

Figure 5:
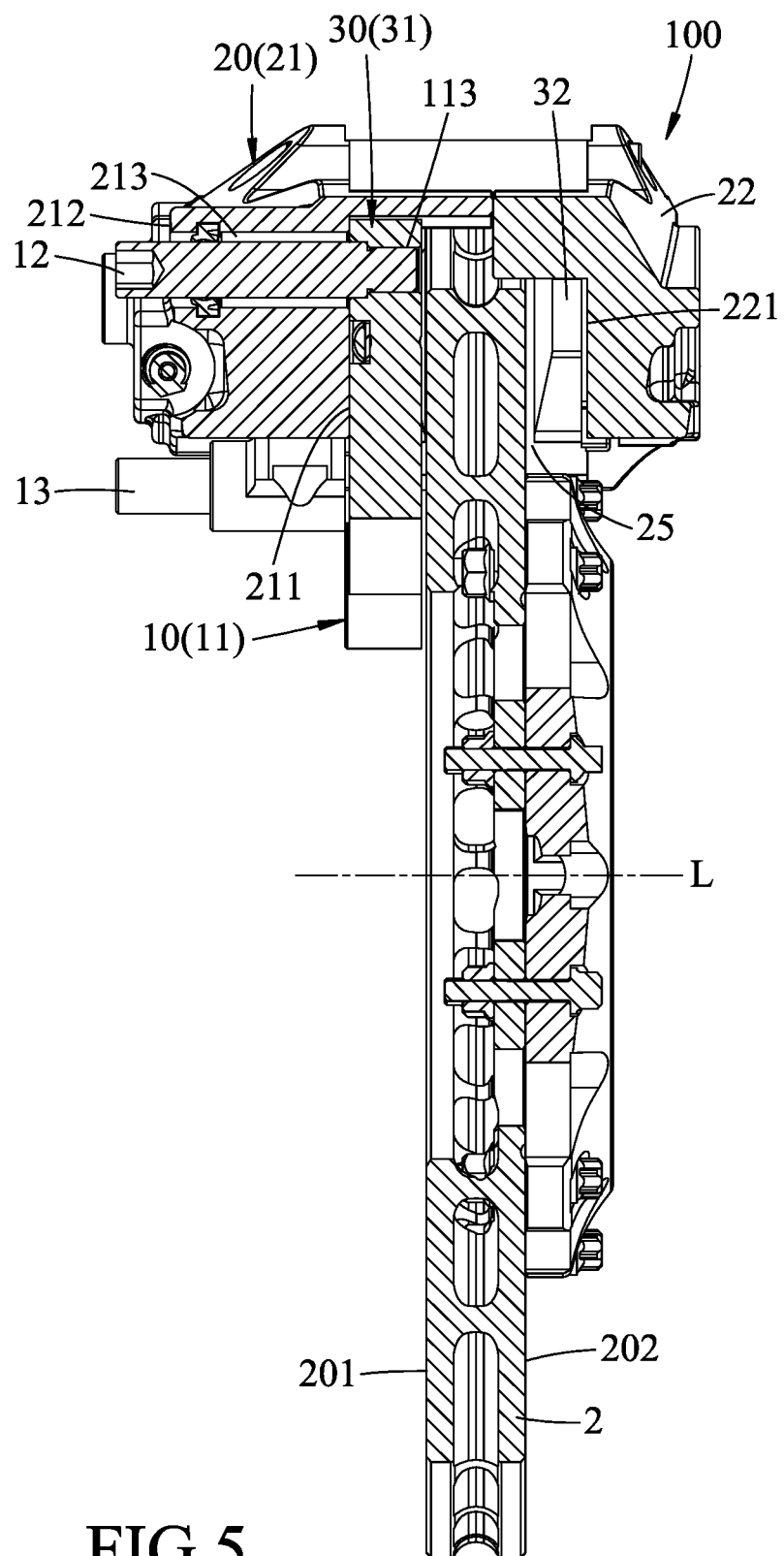
FIG. 5 is a sectional view taken along line V-V in FIG. 3.
Figure 6:
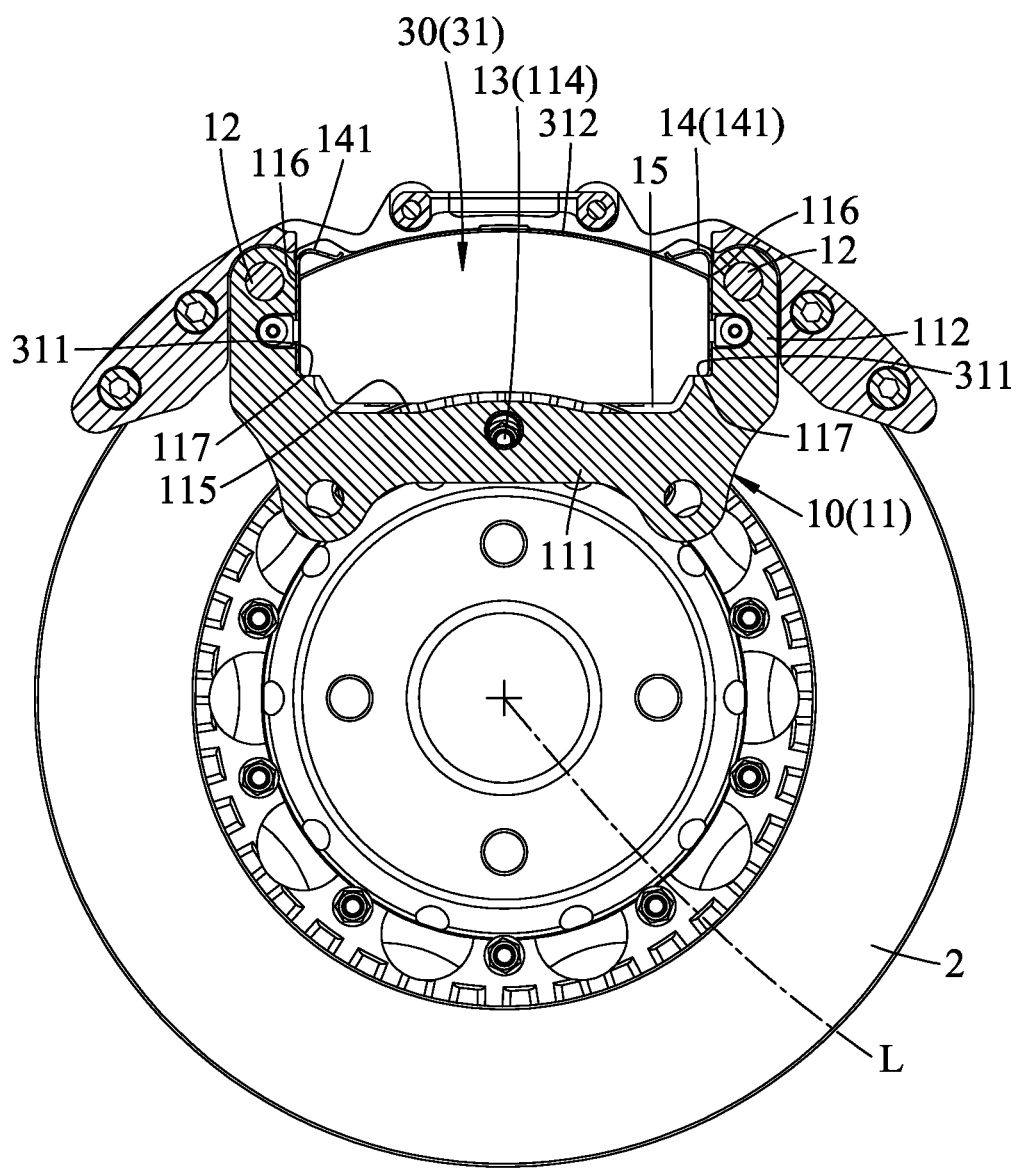
FIG. 6 is a sectional view taken along line VI-VI in FIG. 4.
Figure 7:
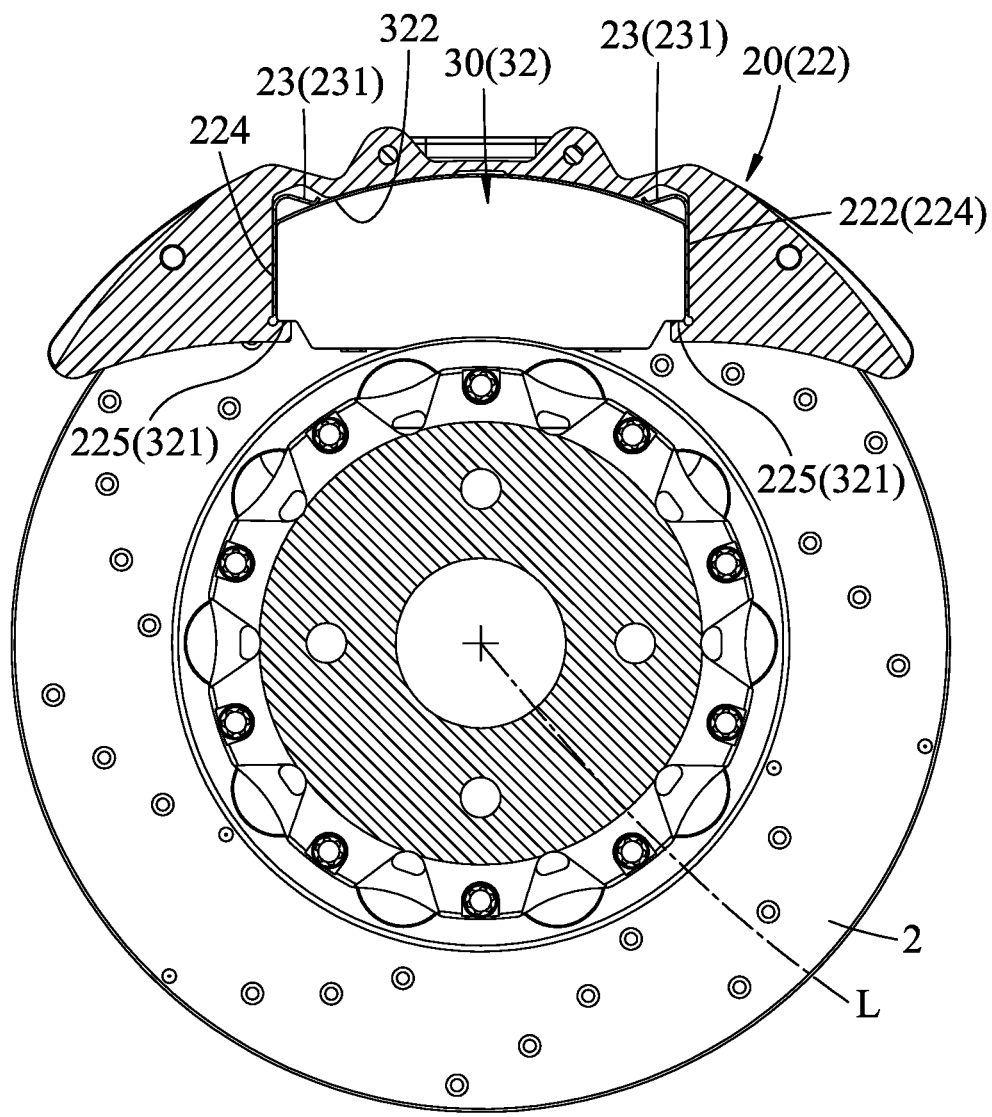
FIG. 7 is a sectional view taken along line VII-VII in FIG. 4.
Figure 8:
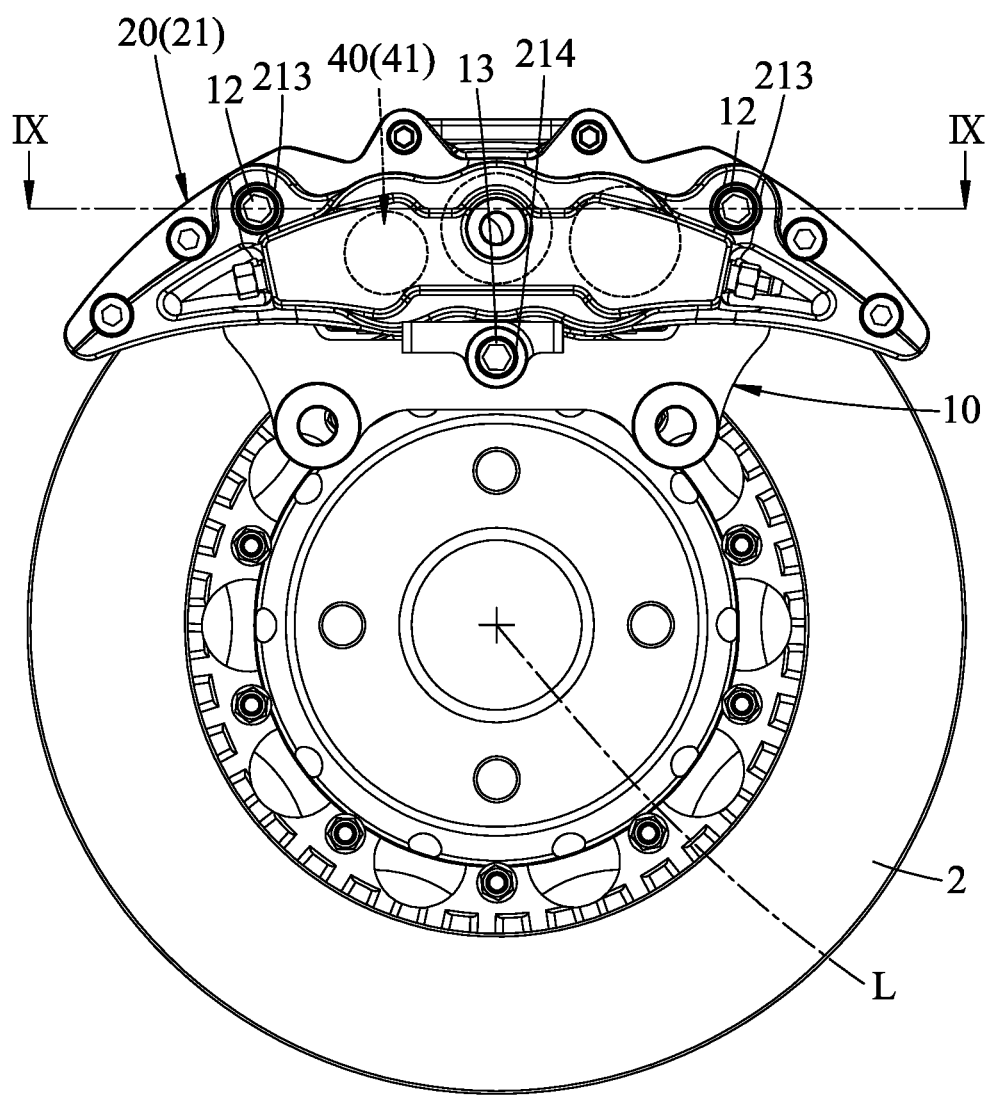
FIG. 8 is a side view of the embodiment and the brake disk.
Figure 9:
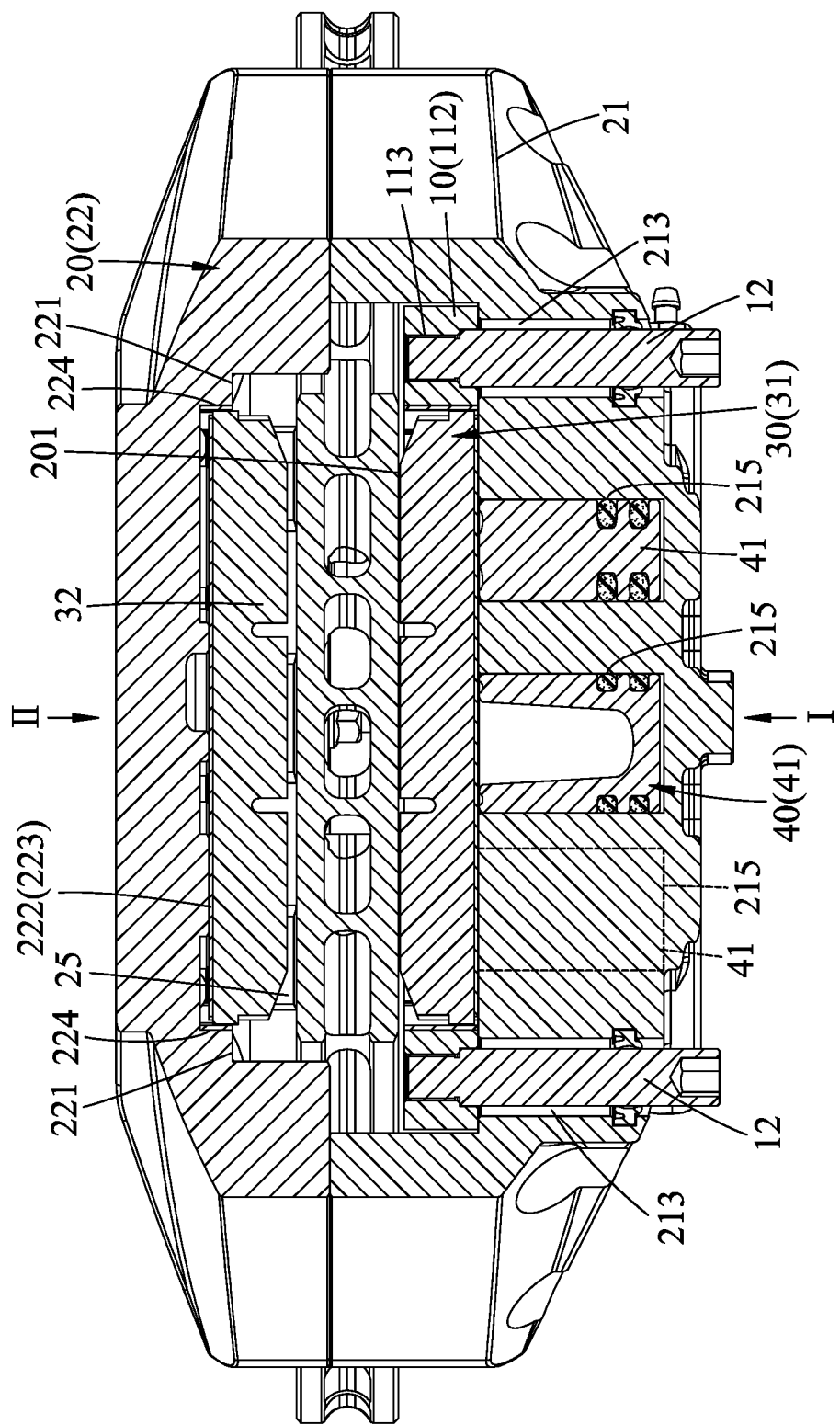
FIG. 9 is a sectional view taken along line IX-IX in FIG. 8.

Referring further to FIGS. 5 and 6, the positioning unit 10 includes a positioning member 11 that is adapted to be fixed to the vehicle body 1, two upper guiding members 12 that are connected to the positioning member 11 and that are parallel to the central axis (L), a lower guiding member 13 that is connected to the positioning member 11, that is parallel to the central axis (L), and that is lower than the upper guiding members 12, and two first resilient sheets 14 that are connected to the positioning member 11. The positioning member 11 has a U-shaped cross-section perpendicular to the central axis (L). Specifically, the positioning member 11 has a base portion 111, and two side portions 112 that respectively and upwardly extend from opposite ends of the base portion 111. The base portion 111 has a top surface 115, and each of the side portions 112 has an inner surface 116 and a stepped shoulder surface 117 that is disposed between the top surface 115 of the base portion 111 and the side surface 116. The top surface 115, the side surfaces 116 and the shoulder surfaces 117 cooperatively define a first receiving groove 15.

Figure 2:
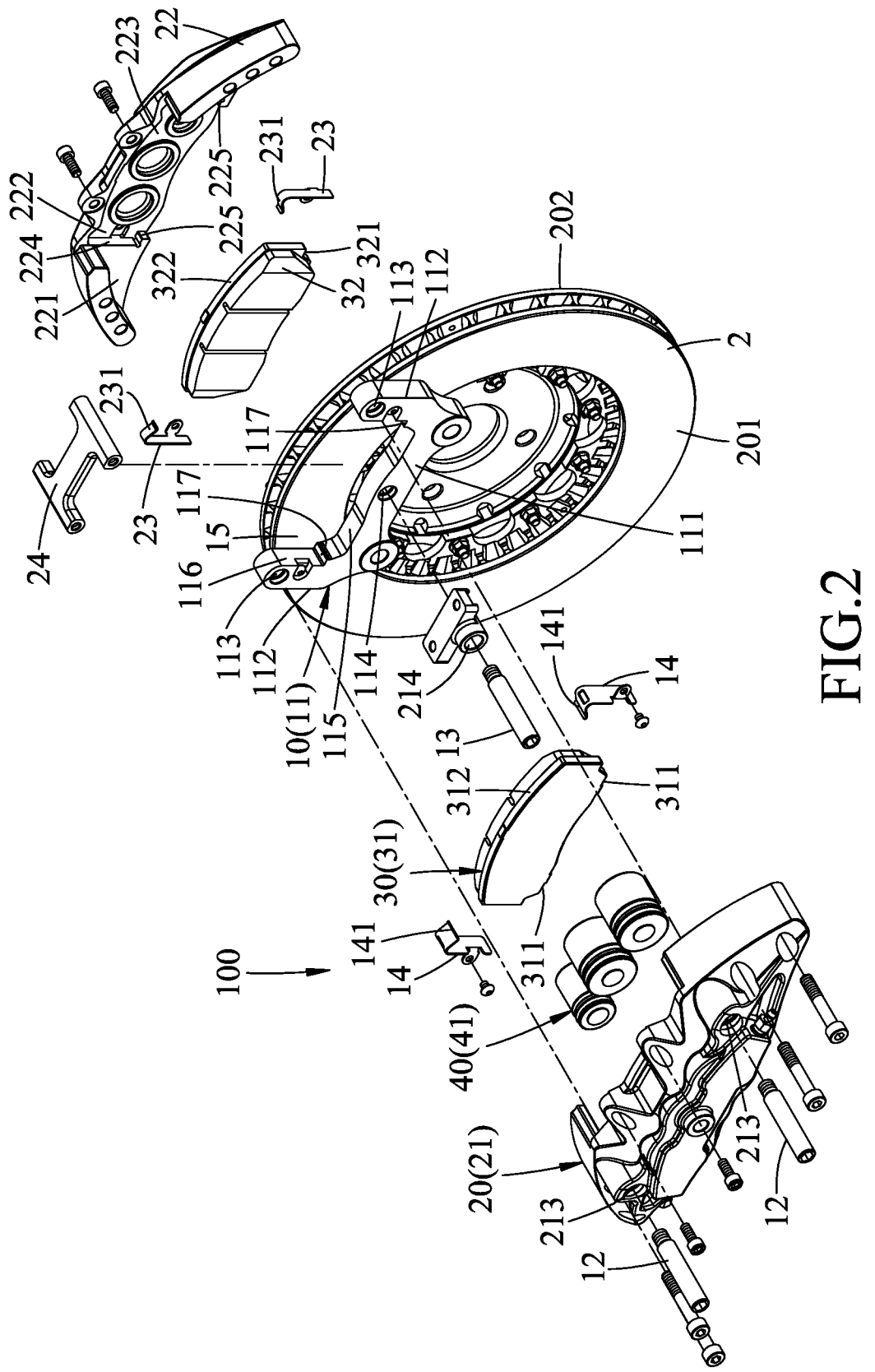
FIG. 2 is an exploded perspective view of the embodiment and the brake disk.
Figure 3:
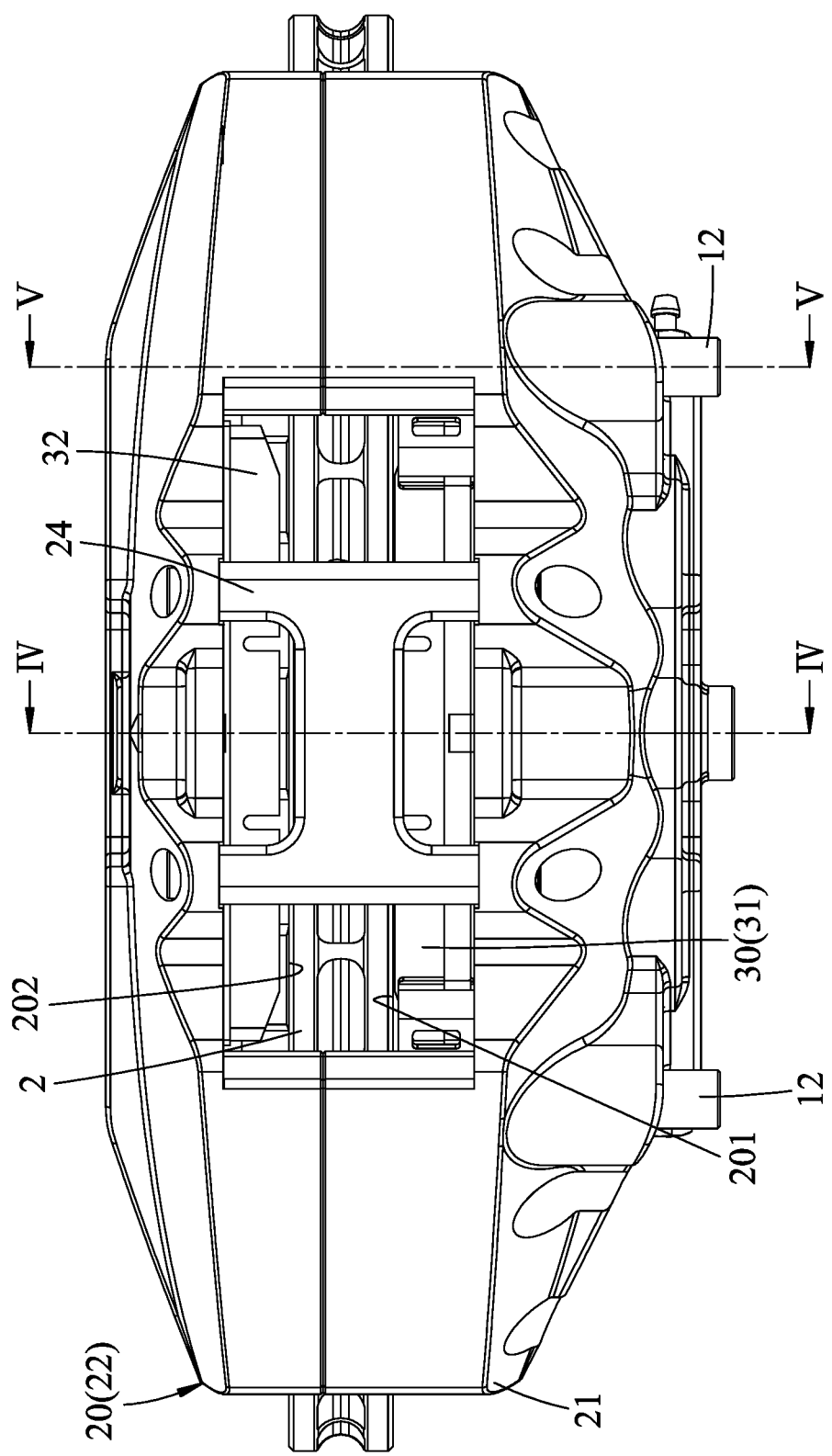
FIG. 3 is a top view of the embodiment.
Figure 4:
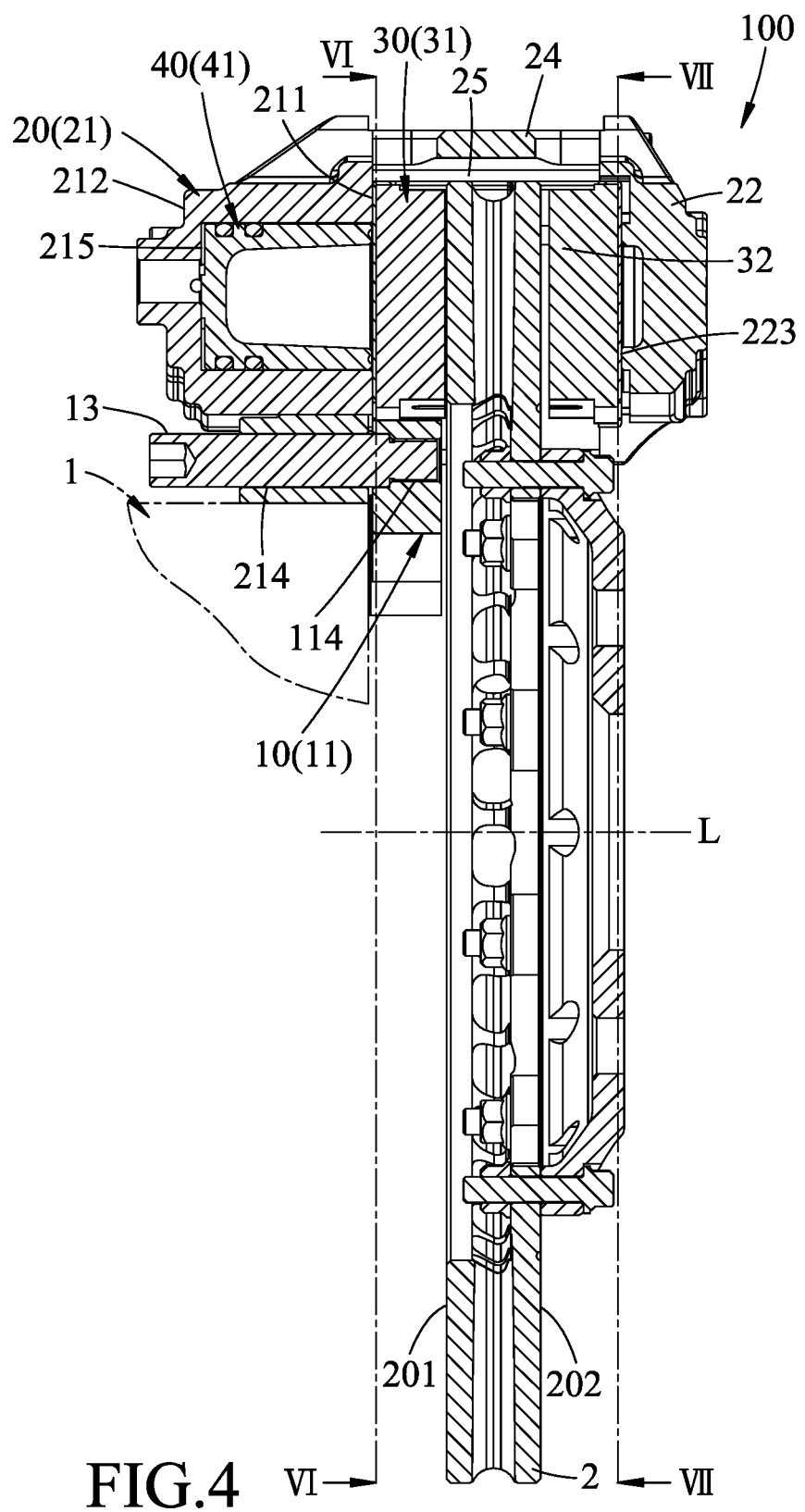
FIG. 4 is a sectional view taken along line IV-IV in FIG. 3.

A top end of each of the side portions 112 distal from the base portion 111 is formed with an upper lock hole 113, and the base portion 111 is formed with a lower lock hole 114 that is disposed between the side portions 112. Each of the upper guiding members 12 is rod-shaped and engages fixedly the upper lock hole 113 of a respective one of the side portions 112. Likewise, the lower guiding member 13 is rod-shaped and engages fixedly the lower lock hole 114 of the base portion 111. It should be noted that, the lower guiding member 13 is located between the upper guiding members 12, and a distance between the lower guiding member 13 and the central axis (L) is smaller than a distance between each of the upper guiding members 12 and the central axis (L). In this embodiment, each of the first resilient sheets 14 is fixedly mounted to a respective one of the side portions 112 via a screw (as shown in FIG. 2), and has an inverted V-shaped resilient portion 141.

Referring to FIGS. 2 and 5 to 7, the main body unit 20 includes a first seat 21, a second seat 22, two second resilient sheets 23 that are connected to the second seat 22, and a connecting member 24. The first seat 21 faces and is adapted to be adjacent to the first side surface 201 of the brake disk 2. The second seat 22 faces and is adapted to be adjacent to the second side surface 202 of the brake disk 2. The first and second seats 21, 22 cooperatively define a receiving space 25 therebetween for receiving an upper part of the brake disk 2. The positioning member 11 of the positioning unit 10 is also received in the receiving space 25, and is adapted to be disposed between the first seat 21 and the first side surface 21 of the brake disk 2.

Referring to FIGS. 5 to 9, the first seat 21 is connected to the upper guiding members 12 and the lower guiding member 13, and is movable parallel to the central axis (L) relative to the first side surface 201 of the brake disk 2. The first seat 21 has a first inner surface 211 that is adjacent to the receiving space 25, a first outer surface 212 that is opposite to the first inner surface 211, two upper through holes 213 that extend through the first inner and outer surfaces 211, 212 and that respectively receive the upper guiding members 12, a lower through hole 214 that is located between the upper through holes 213 and that receives the lower guiding member 13, and a plurality of piston chambers 215 (three in this embodiment) that are formed in the first inner surface 211.

Referring to FIGS. 2, 5, 7 and 9, the second seat 22 has a base wall surface 223, two side wall surfaces 224 that respectively extend from opposite sides of the base wall surface 223 toward the receiving space 25, and two second inner surfaces 221 that respectively extend from the two side wall surfaces 224 away from each other and that are substantially parallel to the base wall surface 223. The base wall surface 223 and the second inner surfaces 221 are respectively distal from and proximate to the receiving space 25. The second seat 22 further has two support surfaces 225, each of which is perpendicularly connected to the side wall surface 223 and a respective one of the side wall surfaces 224. The base wall surfaces 223, the side wall surfaces 224 and the support surfaces 225 cooperatively define a second receiving groove 222 that is adjacent to the receiving space 25.

In this embodiment, each of the second resilient sheets 23 is fixedly mounted to a respective one of the side wall surfaces 224 via a screw (not shown), and has an inverted V-shaped resilient portion 231.

The connecting member 24 interconnects the first and second seats 21, 22, such that the second seat 22 is co-movable with the first seat 21.

Referring back to FIGS. 6 and 7, the lining unit 30 includes a first lining member 31 that is adapted to be disposed between the first seat 21 and the first side surface 201 of the brake disk 2, that is disposed in the receiving space 25 and that is movable parallel to the central axis (L), and a second lining member 32 that is adapted to be movably disposed between the second seat 22 and the second side surface 202 of the brake disk 2, that is disposed in the receiving space 25 and that is movable parallel to the central axis (L).

Specifically, the first lining member 31 is movably disposed in the first receiving groove 15 of the positioning unit 10, has two first abutting surfaces 311 that movably and respectively abut against the shoulder surfaces 117 of the side portions 112 of the positioning member 11, and a first top surface 312 that is opposite to the first abutting surfaces 311. The resilient portions 141 of the first resilient sheets 14 resiliently press against the first top surface 312 toward the base portion 111 of the positioning member 11. The second lining member 32 is received in the second receiving groove 222 of the second seat 22 of the main body unit 20, has two second abutting surfaces 321 that movably and respectively abut against the support surfaces 225 of the second seat 22 of the main body unit 20, and a second top surface 322 that is opposite to the second abutting surfaces 321. The resilient portion 231 of each of the second resilient sheets 23 resiliently presses against the second top surface 322, such that the second lining member 32 comes into contact with the support surfaces 225 of the second seat 22 of the main body unit 20.

Referring back to FIGS. 8 and 9, the actuating unit 40 is mounted to the first seat 21 of the main body unit 20, and includes a plurality of hydraulic pistons 41 that are respectively received in the piston chambers 215 of the first seat 21, and each of which has an end that abuts against the first lining member 31.

The following paragraphs will disclose the operation of the brake caliper device 100 in greater details:

Referring back to FIGS. 4 and 5, after the assembly of the brake caliper device 100 in conjunction with the brake disk 2, during a regular operation in which braking is not initiated, gaps are presented between the first lining member 31 and the first side surface 201 and between the second lining member 32 and the second side surface 202, thereby allowing the brake disk 2 to rotate freely.

Referring back to FIGS. 4 and 9, when a braking process is initiated, pressurized oil is injected into the piston chambers 215, such that the hydraulic pistons 41 are hydraulically operated to push the first lining member 31 in a first direction (I) and toward the first side surface 201 of the brake disk 2. Given that the positioning unit 11 is fixed relative to the central axis (L), when the pressurized oil is continuously injected into the piston chambers 215, a counterforce begins to generate, pushing the first seat 21 of the main body unit 20 away from the brake disk 2 in a second direction (II) opposite to the first direction (I), and simultaneously moving the second seat 22 of the main body unit 20 in the second direction (II) to press the second lining member 32 against the second side surface 202 of the brake disk 2 (since the second seat 22 is co-movably connected to the first seat 31), thereby clamping the brake disk 2 between the first and second lining members 31, 32.

During the counterforce movement of the main body unit 20, the first seat 21 may stably move along the upper guiding members 12 and the lower guiding member 13 without becoming inclined, thereby ensuring that the movement of the main body unit 20 relative to the positioning unit 10 remain be stable for the braking process.

Overall, the implementation of the lower guiding member 13, in conjunction with the upper guiding members 12, ensures that the positioning unit 10 is dimensionally stable and no longer prone to inclination, thereby ensuring smooth movement of the main body unit 20 during the braking process.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A brake caliper device adapted to be mounted to a vehicle body and adapted to be used with a brake disk, the brake disk having a first side surface and a second side surface opposite to the first side surface, the first and second side surfaces being perpendicular to a central axis of the brake disk, said brake caliper device comprising:
   a positioning unit including a positioning member that is adapted to be fixed to the vehicle body, two upper guiding members that are connected to said positioning member and that are parallel to the central axis, and a lower guiding member that is connected to said positioning member, that is parallel to the central axis, and that is lower than said upper guiding members;
   a main body unit including
      a first seat that is connected to said upper guiding members and said lower guiding member, that faces and is adapted to be adjacent to the first side surface of the brake disk, and that is adapted to be movable parallel to the central axis relative to the first side surface of the brake disk, and
      a second seat that is co-movably connected to said first seat, that faces and is adapted to be adjacent to the second side surface of the brake disk, and that cooperates with said first seat to define a receiving space therebetween for receiving a part of the brake disk;
   a lining unit including a first lining member that is adapted to be disposed between said first seat and the first side surface of the brake disk, that is disposed in said receiving space and that is movable parallel to the central axis, and a second lining member that is adapted to be movably disposed between said second seat and the second side surface of the brake disk, that is disposed in said receiving space and that is movable parallel to the central axis; and
   an actuating unit mounted to said first seat, said actuating unit being operable to push said first lining member to abut against the first side surface of the brake disk, so as to generate a counterforce to push said first seat away from the brake disk and to move said second seat to press said second lining member against the second side surface of the brake disk, thereby clamping the brake disk between the first and second lining members.

2. The brake caliper device as claimed in claim 1, wherein:
   said positioning member of said positioning unit is received in said receiving space and is adapted to be disposed between said first seat and the first side surface of the brake disk; and
   said positioning member has a U-shaped cross-section perpendicular to the central axis, and has a base portion and two side portions that respectively and upwardly extend from opposite ends of said base portion and that cooperate with said base portion to define a first receiving groove that receives said first lining member.

3. The brake caliper device as claimed in claim 2, wherein:
   each of said upper guiding members is rod-shaped and is connected to a top end of a respective one of said side portions of said positioning member;
   said lower guiding member is rod-shaped, is connected to said base portion, and is located below and between said upper guiding members;
   a distance between said lower guiding member and the central axis is smaller than a distance between each of said upper guiding members and the central axis; and
   said first seat of said main body unit has a first inner surface that is adjacent to said receiving space, a first outer surface that is opposite to said first inner surface, two upper through holes that extend through said first inner and outer surfaces and that respectively receive said upper guiding members, and a lower through hole that is located between said upper through holes and that receives said lower guiding member.

4. The brake caliper device as claimed in claim 2, wherein:
   said base portion of said positioning member has a top surface;
   each of said side portions of said positioning member has an inner side surface and a shoulder surface that is disposed between said top surface of said base portion and said inner side surface;
   said top surface of said base portion, and said inner side surfaces and said shoulder surfaces of said side portions cooperatively define said first receiving groove; and
   said first lining member has two first abutting surfaces that movably and respectively abut against said shoulder surfaces of said side portions of said positioning member.

5. The brake caliper device as claimed in claim 4, wherein:

said first lining member further has a first top surface that is opposite to said first abutting surfaces; and said positioning unit further includes two first resilient sheets that are connected to said positioning member, and that resiliently press against said first top surface of said first lining member toward said base portion of said positioning member.

6. The brake caliper device as claimed in claim 1, wherein:

said first seat of said main body unit has a first inner surface that is adjacent to said receiving space, and a plurality of piston chambers that are formed in said first inner surface; and said actuating unit includes a plurality of hydraulic pistons that are respectively received in said piston chambers, and that are hydraulically operable to push said first lining member toward the first side surface of the brake disk.

7. The brake caliper device as claimed in claim 1, wherein:

said second seat of said main body unit has
a base wall surface,
two side wall surfaces that respectively extend from opposite sides of said base wall surface toward said receiving space,
two second inner surfaces that respectively extend from said two side wall surfaces away from each other and that are substantially parallel to said base wall surface, said base wall surface and said second inner surfaces being respectively distal from and proximate to said receiving space, and
two support surfaces, each of which is perpendicularly connected to said base wall surface and a respective one of said side wall surfaces;

said base wall surface, said side wall surfaces and said support surfaces cooperatively define a second receiving groove that is adjacent to said receiving space and that receives said second lining member; and said second lining member has two second abutting surfaces that movably and respectively abut against said support surfaces of said second seat of said main body unit.

8. The brake caliper device as claimed in claim 7, wherein:

said second lining member further has a second top surface that is opposite to said second abutting surfaces; and said main body unit further includes two second resilient sheets that are connected to said second seat, and that resiliently press against said second top surface of said second lining member such that said second lining member comes into contact with said support surfaces of said second seat.

* * * * *